(12) United States Patent
Mullen et al.

(10) Patent No.: US 7,044,548 B2
(45) Date of Patent: May 16, 2006

(54) CHILD VEHICLE SEAT HAVING PERMANENTLY ATTACHED LATCH SYSTEM

(75) Inventors: Joshua O. Mullen, Duncannon, PA (US); Robert C. Barrett, Angola, NY (US)

(73) Assignee: Graco Children's Products, Inc., Exton, PA (US)

( * ) Notice: Subject to any disclaimer, the term of this patent is extended or adjusted under 35 U.S.C. 154(b) by 38 days.

(21) Appl. No.: 10/071,234

(22) Filed: Feb. 11, 2002

(65) Prior Publication Data

US 2003/0160485 A1 Aug. 28, 2003

(51) Int. Cl.
*B60N 2/26* (2006.01)

(52) U.S. Cl. ............. 297/253; 297/254; 297/250.1

(58) Field of Classification Search ........... 297/250.1, 297/253, 254
See application file for complete search history.

(56) References Cited

U.S. PATENT DOCUMENTS

| | | |
|---|---|---|
| 2,679,670 A | 6/1954 | Griswold |
| 2,799,322 A | 7/1957 | Jordan |
| 3,791,694 A | 2/1974 | Roberts et al. |
| 4,768,828 A | 9/1988 | Kohketsu |
| 5,383,708 A | 1/1995 | Nagasaka et al. |
| 5,385,386 A | 1/1995 | Beamish et al. |
| 5,487,588 A | 1/1996 | Burleigh et al. |
| 5,536,066 A | 7/1996 | Sedlack |
| 5,630,645 A | 5/1997 | Lumley et al. |
| 5,669,663 A | 9/1997 | Feuerherdt |
| 5,695,243 A * | 12/1997 | Anthony et al. ..... 297/250.1 X |
| 5,713,630 A * | 2/1998 | Kvalvik ............... 297/254 X |
| 5,809,620 A | 9/1998 | Crowley et al. |
| 5,816,651 A | 10/1998 | Feuerherdt |
| 5,845,967 A | 12/1998 | Kane et al. |
| 5,918,934 A | 7/1999 | Siegrist |
| 5,941,601 A | 8/1999 | Scott et al. |
| 5,957,531 A | 9/1999 | Kane et al. |
| 5,979,982 A | 11/1999 | Nakagawa |
| 6,017,087 A | 1/2000 | Anthony et al. |
| 6,024,408 A | 2/2000 | Bello et al. |
| 6,030,046 A | 2/2000 | Dorow |
| 6,048,028 A | 4/2000 | Bapst |
| 6,050,640 A | 4/2000 | Gibson et al. |
| 6,079,780 A | 6/2000 | Bapst |
| 6,082,818 A | 7/2000 | Muller |
| 6,082,819 A | 7/2000 | Jackson |
| 6,095,604 A | 8/2000 | Stack et al. |
| 6,193,310 B1 * | 2/2001 | Batalaris et al. ........ 297/253 X |

(Continued)

FOREIGN PATENT DOCUMENTS

DE 195 45 266 A1 5/1997

(Continued)

OTHER PUBLICATIONS

Safety 1st Brochure, "Forerunner LATCH Car Seat," 1 pp. (car seat available pre-Feb. 2002).

(Continued)

*Primary Examiner*—Anthony D. Barfield
(74) *Attorney, Agent, or Firm*—Foley & Lardner, LLP

(57) ABSTRACT

A latch system adapted for use with a child vehicle seat has a securing belt, latches which are disposed at each end of the securing belt, and a connection member. The latches are adapted for connection to anchor points rigidly connected to the vehicle. The connection member has a loop portion through which the securing belt is slidably disposed and a connection portion adapted for permanent connection to the child vehicle seat.

22 Claims, 14 Drawing Sheets

U.S. PATENT DOCUMENTS

| | | |
|---|---|---|
| 6,209,957 B1 | 4/2001 | Baloga et al. |
| 6,213,696 B1 | 4/2001 | Austin |
| 6,234,572 B1 | 5/2001 | Shiino et al. |
| 6,267,442 B1 | 7/2001 | Shiino et al. |
| 6,305,745 B1 | 10/2001 | Rijsdijk |
| 6,325,454 B1 | 12/2001 | Maier |
| 6,334,649 B1 | 1/2002 | Boegge et al. |
| 6,543,846 B1 | 4/2003 | Cone |
| 6,592,183 B1 | 7/2003 | Kain |
| 2001/0010431 A1 | 8/2001 | Sasaki et al. |
| 2001/0013716 A1 | 8/2001 | Hayashi et al. |
| 2002/0008416 A1 | 1/2002 | Deptolla |
| 2002/0113470 A1 | 8/2002 | Kain |

FOREIGN PATENT DOCUMENTS

| | | |
|---|---|---|
| GB | 1 494 651 | 12/1977 |

OTHER PUBLICATIONS

Safety 1st Brochure, "Forerunner 5-Point Convertible Car Seat with LATCH," 1 pp. (car seat available pre-Feb. 2002).

Photographs of Safety 1st car seat with LATCH, 4 pp. (car seat available pre-Feb. 2002).

Cosco Brochure, "LATCH Retro-fit Kit," 1 pp. (kit available pre-Feb. 2002).

"Federal Motor Vehicle Safety Standards; Child Restraint Systems; Child Restraint Anchorage Systems; Final Rule," 49 CFR Parts 571 and 596, vol. 64, No. 43, pp. 10786-10850 (Mar. 5, 1999).

Photograph of Fisher Price Safe Embrace II Convertible Childseat, 1 pp. (Jan. 2001).

Photograph of LATCH retrofit kits, 1 pp.; see http://www.pbase.com/image/2495807.

* cited by examiner

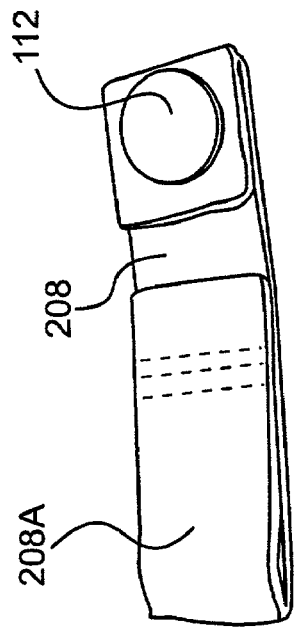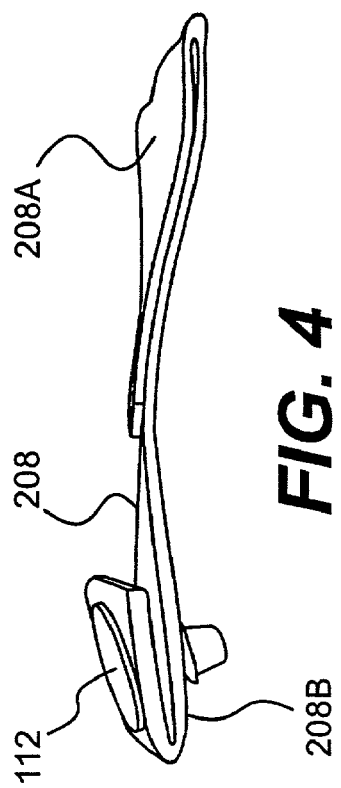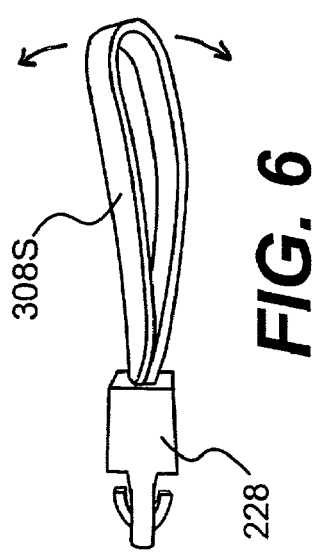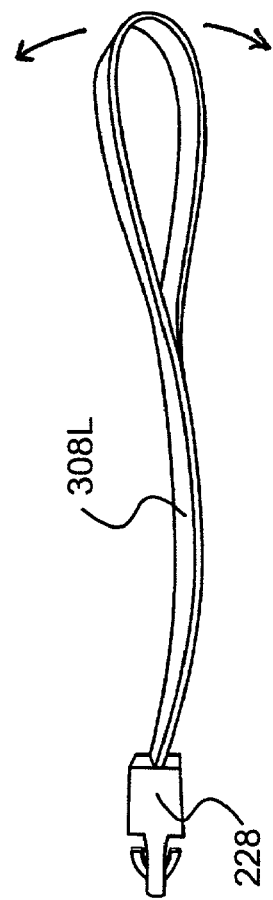

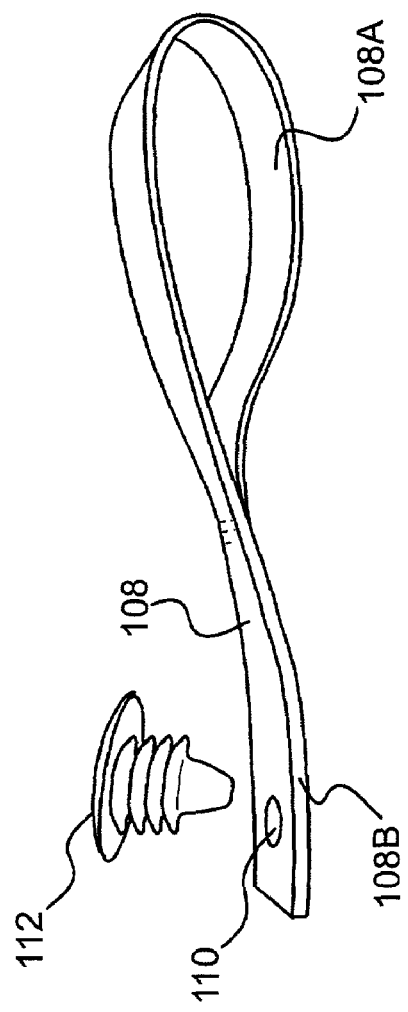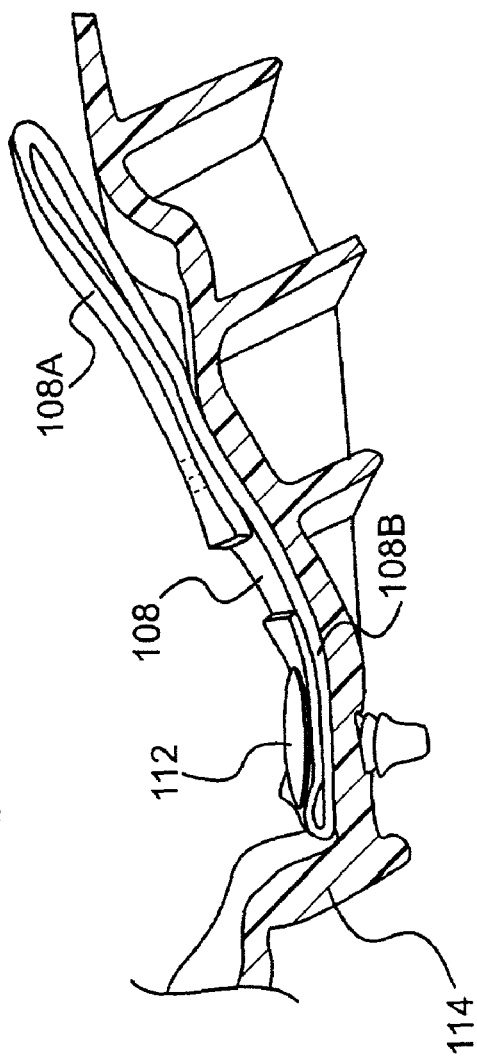

CHILD VEHICLE SEAT HAVING PERMANENTLY ATTACHED LATCH SYSTEM

BACKGROUND OF THE INVENTION

The present invention relates generally to child vehicle seats. More specifically, the present invention relates to a latch system that is permanently attached to the child seat in a manner that facilitates connection of the seat, in either one or both of forward and rearward facing orientations, to anchor members rigidly connected with the vehicle chassis.

Newer vehicles are being constructed to better facilitate connection of child seats to the rear seats of the vehicle. For example, new regulations are being promulgated that will require child seat manufacturers to include a provision on the child seat to secure the seat to a pair of anchor members secured to the vehicle chassis. These anchor members will consist of essentially U-shaped metal brackets that are accessible between the lower edge of the vehicle back cushion and the rear edge of the vehicle seat cushion.

Some child seats are equipped with a seat restraint system designed to connect to anchor members provided in the rear seats of vehicles in accordance with the new regulations. One such restraint system includes two separate securing straps. One end of each securing strap is connected to the child seat by mount plates. These mount plates are pivotally connected to the child seat via, for example, a suitable bolt arrangement. The other end of each strap is provided with hook-like attachment latches that can be hooked onto and engaged with the anchor members. The hook-like attachment latches can include a curved finger portion and a resiliently biased clip which, in combination, form a passage for extending about the anchor in a secure but removable manner. The securing straps are pivotally mounted to the child seat so that the child seat can be selectively oriented either forwardly or rearwardly with respect to the forward direction of travel of the vehicle.

Because the two securing straps are separately connected to the child seat, each strap must be adjustable to allow for vehicles having varying seat configurations and to allow the child seat to be snugly tethered in place. This, of course, undesirably increases cost and complexity of the child seat. Additionally, the number of operations needed to install the child seat in position is increased. Thus, there remains a need for a child seat with a simplified manner of connecting a latch system associated with the child seat to anchor members mounted to the vehicle.

It is therefore an object of the present invention to provide a latch system that solves the aforementioned problems and drawbacks of known child seats. This object is not limiting on the present invention, as many other advantageous and objects of the present invention are provided, as discussed further below. Furthermore, all of the deficiencies of existing child seat designs, discussed above, are not necessarily overcome by each exemplary embodiment of the present invention discussed below.

SUMMARY OF THE INVENTION

The present invention provides a latch system adapted for use with a child vehicle seat, where the latch system includes provision for simplified installation of the child vehicle seat to anchor members in the vehicle. The present invention also provides a latch system that is easy to convert for use with forward facing and rearward facing belt paths.

According to the present invention, in order to facilitate the ready connection of latches secured to the ends of a securing belt of a latch system, the securing belt is slidably disposed through an opening or loop of a connection member permanently connected to the child vehicle seat. An embodiment of this connection member comprises a strap that has one end fastened to the child seat so that it can be folded over or pivoted about the point of connection with the child seat. This folding/pivoting ability allows the securing belt to be threaded through openings in the child seat along a forward facing seat belt path or a rearward facing seat belt path.

More specifically, the present invention provides a latch system adapted for use with a child vehicle seat. The latch system includes a securing belt, latches disposed at each end of the securing belt, and a connection member. The latches are adapted for connection to anchor points rigidly connected to a portion of the vehicle. The connection member has a loop portion through which the securing belt is slidably disposed and a connection portion adapted for permanent connection to the child vehicle seat. The loop portion preferably has an inside dimension smaller than a circumference of the largest portion of the latches.

In this arrangement, the connection member can comprise a piece of webbing and a fastener. The piece of webbing can have a loop formed at a first end to define the loop portion and a connection hole at a second end to define the connection portion. The loop is sized to prevent the passage of a latch therethrough. The fastener can be disposed through the connection hole and adapted to engage permanently in an opening formed in the child vehicle seat. The piece of webbing can have a length sufficient for it to: a) extend away from the fastener to a site on the child vehicle seat wherein the securing belt is disposable along a first belt path used to secure the child vehicle seat in one of a rearward facing position and a forward facing position relative to a forward direction of travel of the vehicle, and b) fold over the fastener and extend to a site on the child vehicle seat wherein the securing belt is disposable along a second belt path used to secure the child vehicle seat in the other of the rearward facing position and the forward facing position relative to the forward direction of travel of the vehicle. Alternatively, the piece of webbing can have a length sufficient for it to: a) extend from the fastener to a site on the child vehicle seat where the belt is disposable along a first belt path used to secure the child vehicle seat in a rearward facing position relative to the forward direction of travel of the vehicle, and b) rotate about the fastener and extend to a site on the child vehicle seat wherein the belt is disposable along a second belt path used to secure the child vehicle seat in a forward facing position relative to the forward direction of travel of the vehicle. The first belt path can include a first pair of openings formed in the child vehicle seat, and the second belt path can include a second pair of openings formed in the child vehicle seat.

Further, as an alternative to webbing, the connection member can comprise a lanyard having a loop at one end, and a fastening member permanently connected at the other end. The fastening member is adapted for permanent connection to the seat.

In order to adjust the length of the securing belt, the latch system also can comprise a length adjusting mechanism provided on the securing belt, for example, proximate one end of the securing belt.

Another aspect of the invention resides in a method of latching a child vehicle seat in a predetermined operative position in a vehicle. The method includes the steps of:

hooking a first latch member, provided at a first end of a securing belt, to a first anchor point rigidly connected with a first portion of the vehicle; sliding the securing belt through a loop formed in a connection member which is permanently connected to the child vehicle seat; and hooking a second latch member, provided at a second end of the securing belt, to a second anchor point rigidly connected with a second portion of the vehicle.

This method may further comprise the steps of: setting the child vehicle seat in a rearward facing orientation with respect to a forward direction of travel of the vehicle; and manipulating the connection member to a first state wherein the securing belt is locatable along a first securing belt path adapted for connecting the child vehicle seat to the first and second anchor points with the child vehicle seat facing opposite the forward direction of vehicle travel. Additionally, the method may comprise the steps of: setting the child vehicle seat in a forward facing orientation with respect to the forward direction of travel of the vehicle; and manipulating the connection member to a second state wherein the securing belt is locatable along a second securing belt path adapted for connecting the child vehicle seat to the first and second anchor points with the child vehicle seat facing in the forward direction of vehicle travel.

Yet another aspect of the invention resides in a child vehicle seat adapted for installation in vehicle having anchor points disposed at predetermined portions of the vehicle. The child vehicle seat comprises a seat body; a securing belt with latches at either end; and a connection member having a loop portion through which the belt is slidably disposed and a connection portion that is permanently connected to the seat body.

In accordance with this aspect of the invention, the seat body has a plurality of openings formed therein which are adapted to establish a first belt path along which the securing belt can pass to secure the child vehicle seat in a rearward facing orientation with respect to the forward direction of travel of the vehicle and to establish a second belt path along which the securing belt can pass to secure the child vehicle seat in a forward facing orientation with respect to the forward direction of travel of the vehicle.

A further aspect of the invention resides in a connection member adapted to slidably secure a securing belt of a latch system to a child vehicle seat. The connection member has a loop portion and a connection portion. The loop portion is adapted to slidably receive the securing belt having latches disposed at each end, while the connection portion is adapted for permanent connection to the child vehicle seat.

In accordance with the invention, the connection member can be molded into the child vehicle seat; that is, it can be formed as an integrally molded portion of the child vehicle seat. In this embodiment, the connection member can form a bridge shaped portion which defines the loop portion through which the securing belt can be disposed.

In another aspect of the invention, the connection member can include a first end unitarily formed with the child vehicle seat and a second end formed with a snap connection feature to permanently engage in an opening formed in the child vehicle seat.

As an alternative to the all webbing type of connection member, a connection member can be provided that includes a loop of webbing attached to a piece of non-webbing material, wherein the piece of material has a hole adapted to receive a fastener. The piece of material can be a flexible plastic material.

In a further aspect of the invention, a connection member is provided that includes first and second substantially flat members. The first member is overlaid on the second member and is permanently connected thereto. The first and second members are configured to provide a pair of slots through which the securing belt can be slidably threaded. At least one of the slots is sized to prevent the passage of a latch member therethrough.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIGS. 4 and 5 are perspective views showing a connection strap according to second embodiment of the latch system, which is adapted for seat arrangements wherein the connection strap is folded over for improved strength at the location where the hole for the fastener is formed;

FIGS. 6 and 7 are perspective views showing long and short lanyard type connection straps having connection ends which are adapted to be inserted into openings or jack sites formed in the child seat body;

FIG. 8 is a perspective view showing a connection strap similar to that of FIG. 3 and the manner in which a "press-in" type fastener can establish permanent connection between the connection strap and a child seat body;

FIG. 9 is a partial sectional view showing a connection strap similar to that of FIGS. 4 and 5 and the manner in which a "press-in" type fastener establishes permanent connection between the connection strap and the child seat body;

DETAILED DESCRIPTION OF THE PREFERRED EMBODIMENTS

Figure 1:
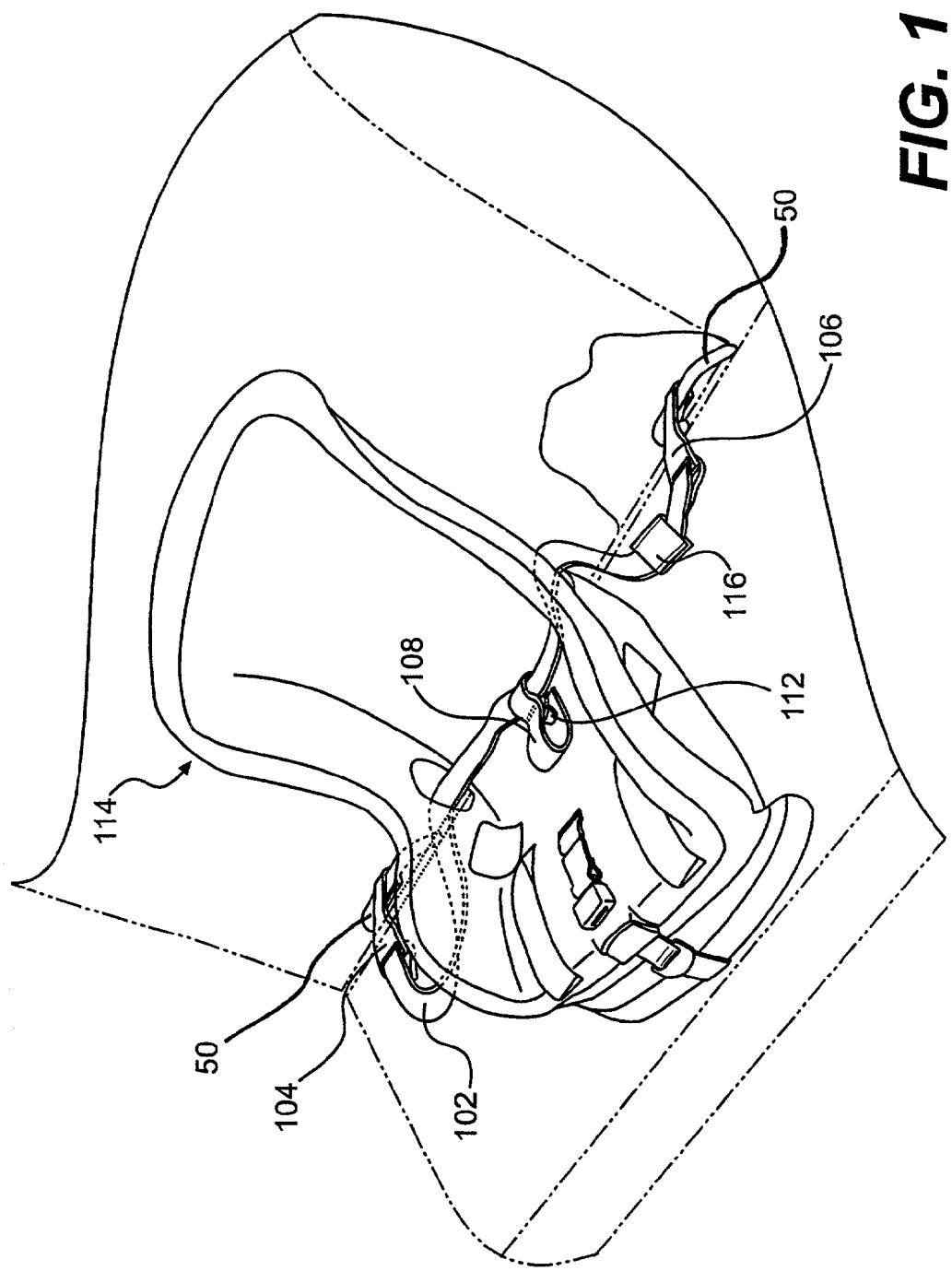
FIG. 1 is a perspective view showing a child seat secured in a forward facing position on a typical automotive vehicle seat using the latch system according to a first embodiment of the invention.

FIGS. 1–3 and 8 show a first embodiment of a latch system adapted for use with a child vehicle seat in accordance with the invention. Child vehicles seats can include the full spectrum of seat arrangements that can be installed in a vehicle, including infant, convertible, and booster seats. As will be best appreciated from FIG. 3, the latch system 100 comprises an elongate securing belt 102, latches 104, 106, and a connection member 108. The securing belt 102 can be formed of webbing, and the latches 104, 106 are fixedly connected to either end of the securing belt 102, for example, by sewing, heat staking, ultrasonic welding or any other suitable connection technique. A length adjusting mechanism 116 can be provided on the securing belt 102, for example, proximate one of the belt's ends.

The latches 104, 106 are adapted for connection to essentially U-shaped anchor members 50 that are secured to the vehicle chassis and are accessible between the lower edge of the vehicle back cushion and the rear edge of the vehicle seat cushion. Although not specifically shown, it will be understood that these anchor members 50 are welded to, or otherwise permanently connected to, the vehicle chassis. The latches 104, 106 can be hook-like arrangements or, alternatively, can be latches having such configurations as described in U.S. application Ser. No. 09/564,952, filed May 4, 2000, or U.S. application Ser. No. 09/870,709, filed Jun. 1, 2001, both of which are incorporated herein in their entirety. The latch system of the present invention is a non-rigid latch system in that the securing belt is flexible, as distinct from rigid or semi-rigid latch systems that employ rigid rods or shafts to connect the child seat to the anchor members.

The connection member 108, in this embodiment, is formed by a piece of webbing. One end of the webbing is folded over and sewn, heat staked, ultrasonically welded, or otherwise attached to form a loop portion 108A through which the securing belt webbing 102 is slidably disposed. As shown, although the securing belt 102 is slidable through the loop 108A, the loop 108A is sized to prevent the passage of either of the latches 104, 106 therethrough, and thus establishes a permanent connection between the two pieces of webbing 102, 108. The other end of the webbing forms a connection portion 108B. The connection portion 108B has an opening or hole 110 through which a fastener 112 can be disposed. The fastener 112 is used to establish a permanent connection to a body of the child vehicle seat 114, preferably to the shell or base of the child vehicle seat. The connection is permanent in that disconnection is not intended to occur and would be expected to occur only through the use of tools and/or application of an amount of force in excess of the force that occurs during proper use. More particularly, in a preferred embodiment, the fastener 112 cannot be disconnected from the child seat absent tools or application of a pull-out force in excess of a predetermined limit, such as 45 lbs. (force).

The fastener 112 used in this embodiment can take the form of a barbed fastener or so called "Christmas tree" type fastener. This barbed fastener 112 is advantageous in that it can be pressed through the hole 110 (see FIG. 8) which is seared, and/or otherwise suitably reinforced, through the second end 108B of the connection member 108. The searing process fuses the webbing surrounding the inner periphery of the hole and thus attenuates any tendency for the webbing of the connection member 108 to tear. Metal or rigid plastic grommets or the like can be inserted to reinforce the hole 110, if so desired.

Another way that the second end of the connector webbing can be strengthened is shown in FIGS. 4 and 5. As will be appreciated from these figures, the second end 208B of the webbing 208 can be folded over and holes, through which the fastener 112 is disposed, are formed (for example, seared) through two layers of webbing instead of one.

The length of the connection member 108, 208 can be, for example, about 6–6.5 inches (about 15–17 cm). This allows the connection member 108, 208 to be folded from the state shown in FIG. 2, to accommodate a seat facing the rear of the vehicle, to the state shown in FIG. 1, to accommodate a seat facing the front of the vehicle.

As an alternative to folding the connection member 108, 208 to change its orientation to accommodate a forward facing seat or a rearward facing seat, as appropriate, the connection member 108 can be pivoted about the fastener 112. The connection member 108 can move through about 180°, from the position shown in FIG. 2, where the securing belt 102 is disposed along a first belt path suitable for securing the child vehicle seat in a rearward facing position relative to the direction of vehicle travel, to the position shown in FIG. 1, where the securing belt 102 can be disposed along a second belt path suitable for securing the child vehicle seat in a forward facing position relative to direction of vehicle travel.

To secure the child vehicle seat 114 in the orientation shown in FIG. 1, the child vehicle seat 114 can be set in a forward facing orientation with respect to the forward direction of travel of the vehicle, and the connection member 108 can be manipulated to a state where the securing belt 102 is located along a belt path adapted for connection to the child vehicle seat in the forward facing direction. In this state, the connection member 108 is directed toward a top of the child vehicle seat. To secure the child vehicle seat 114 in the orientation shown in FIG. 2, the child vehicle seat 114 can be set in a rearward facing orientation with respect to the forward direction of travel of the vehicle, and the connection member 108 can be manipulated to a different state where the securing belt 102 is located along a belt path adapted for connection to the child vehicle seat in the rearward facing direction. In this state, the connection member 108 is directed toward a front of the child vehicle seat.

A method of latching a child vehicle seat in a predetermined operative position in a vehicle can include hooking a first latch member (for example, latch 104 shown in FIG. 1) to a first anchor point 50 rigidly connected with a first portion of the vehicle. The securing belt 102 can be slid through the loop 108A formed in the connection member 108, and the second latch member 106 can be hooked to a second anchor point 50 rigidly connected with a second portion of the vehicle. The method can also include adjusting the length of the securing belt 102 using a length adjusting mechanism 116 provided on the securing belt 102.

Because the securing belt 102 can slide through the loop of the connection member (for example, loop 108A of connection member 108), either latch 104, 106 can be connected to an appropriate anchor member 50 first. The belt 102 then can be manually pulled and slid through the loop of the connection member to bring the second latch member to the second anchor member 50. If insufficient slack is present in the securing belt 102, the length of the securing belt 102 can be increased via the adjusting mechanism 116. When both latches 104, 106 are securely connected to the appropriate anchor members 50, 50, the slack in the belt 102 can be removed via the adjusting mechanism 116. The child vehicle seat 114 need not be moved relative to the vehicle seat surface on which it rests.

FIGS. 6 and 7 show another embodiment of a connection member in accordance with the invention. These connection members 308S and 308L comprise lanyard type connection members. The connection members 308S and 308L (where S and L denote short and long, respectively) are provided with connection ends 228 adapted to be inserted into openings or jack sites formed in the child seat body. The openings or jack sites can be sized and configured to receive completely the connection ends 228 to limit the amount the ends protrude from the child seat. Once inserted, the flexible lanyard connection members 308S, 308L can be oriented or bent in either direction, as shown by the arrows in FIGS. 6 and 7. The connection members 308S, 308L thus are suitable for use when the child seat is in either the forward facing orientation shown in FIG. 1 or in the rearward facing orientation shown in FIG. 2.

FIG. 9 depicts the manner in which a connection member, here, connection member 208, can be connected to the child seat body using a fastener 112. The ability of this type of fastener 112 (a "Christmas tree" fastener) to be pressed into position without the use of tools is advantageous from the point of ease and efficiency of production.

Figure 10:
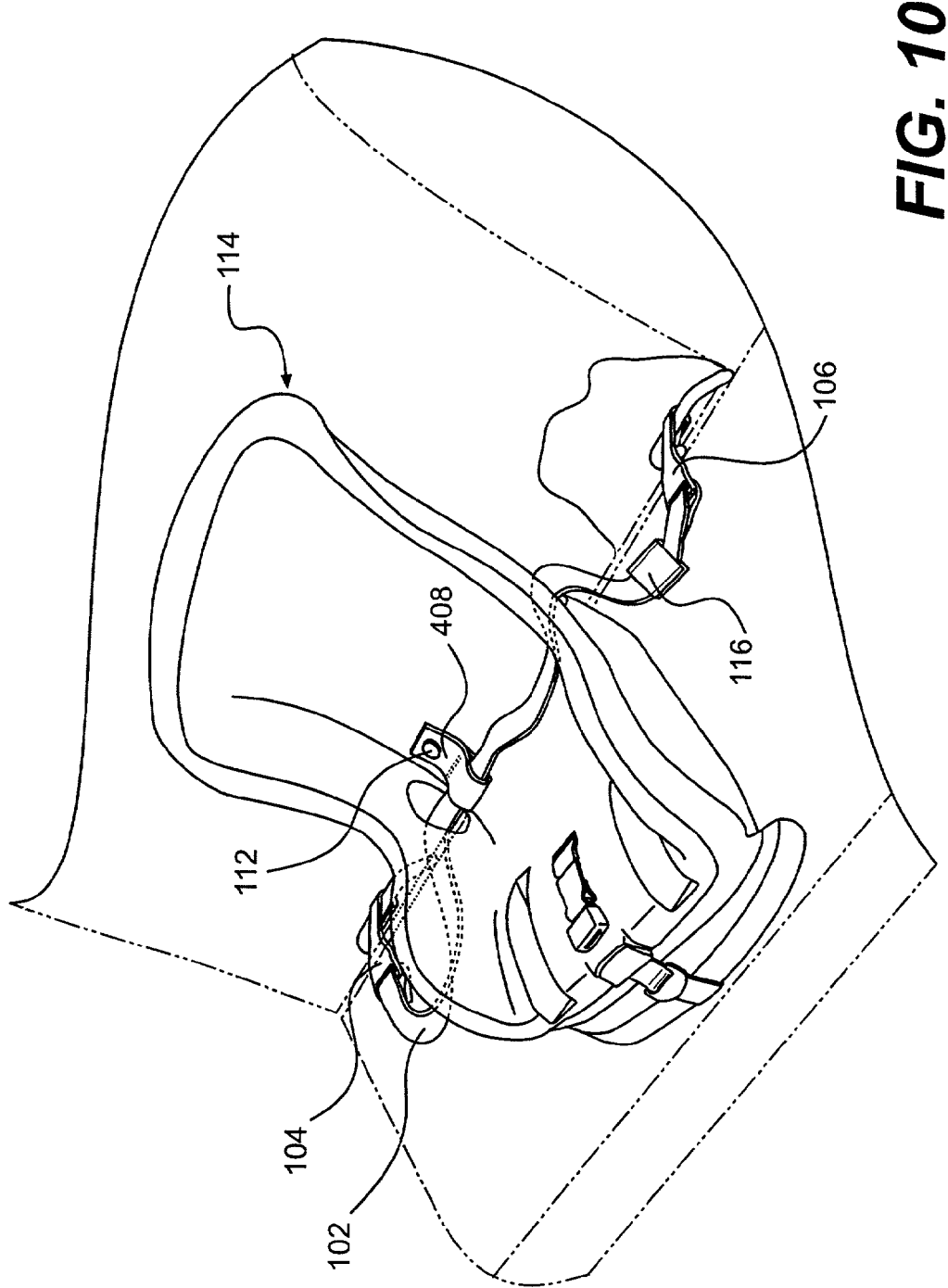
FIG. 10 is a perspective view showing an embodiment of the invention employing a short connection strap.

FIG. 10 shows another embodiment of a connection member 408 in accordance with the invention. In this embodiment, the connection member 408 is formed of a shortened piece of webbing. The webbing is folded back on itself so that the ends of the webbing meet. The webbing 408 is permanently connected to the child vehicle seat by, for example, the press-in or "Christmas tree" fastener 112 discussed in connection with FIG. 9. The fastener 112 is inserted through holes in both ends of the webbing. The webbing 408 is of a length sufficiently short so that the loop formed by the webbing allows sliding movement of the securing belt 102, but does not allow passage of the latches 104, 106 therethrough. This connection member 408 is best suited for use in a child seat having a single belt path. FIG. 10, for example, shows the connection member 408 mounted to a child vehicle seat having holes for only a forward facing belt path, as is common in conventional booster seats. This connection member 408 could also be used with infant seats, which typically have holes only for a rearward facing belt path.

Figure 11:
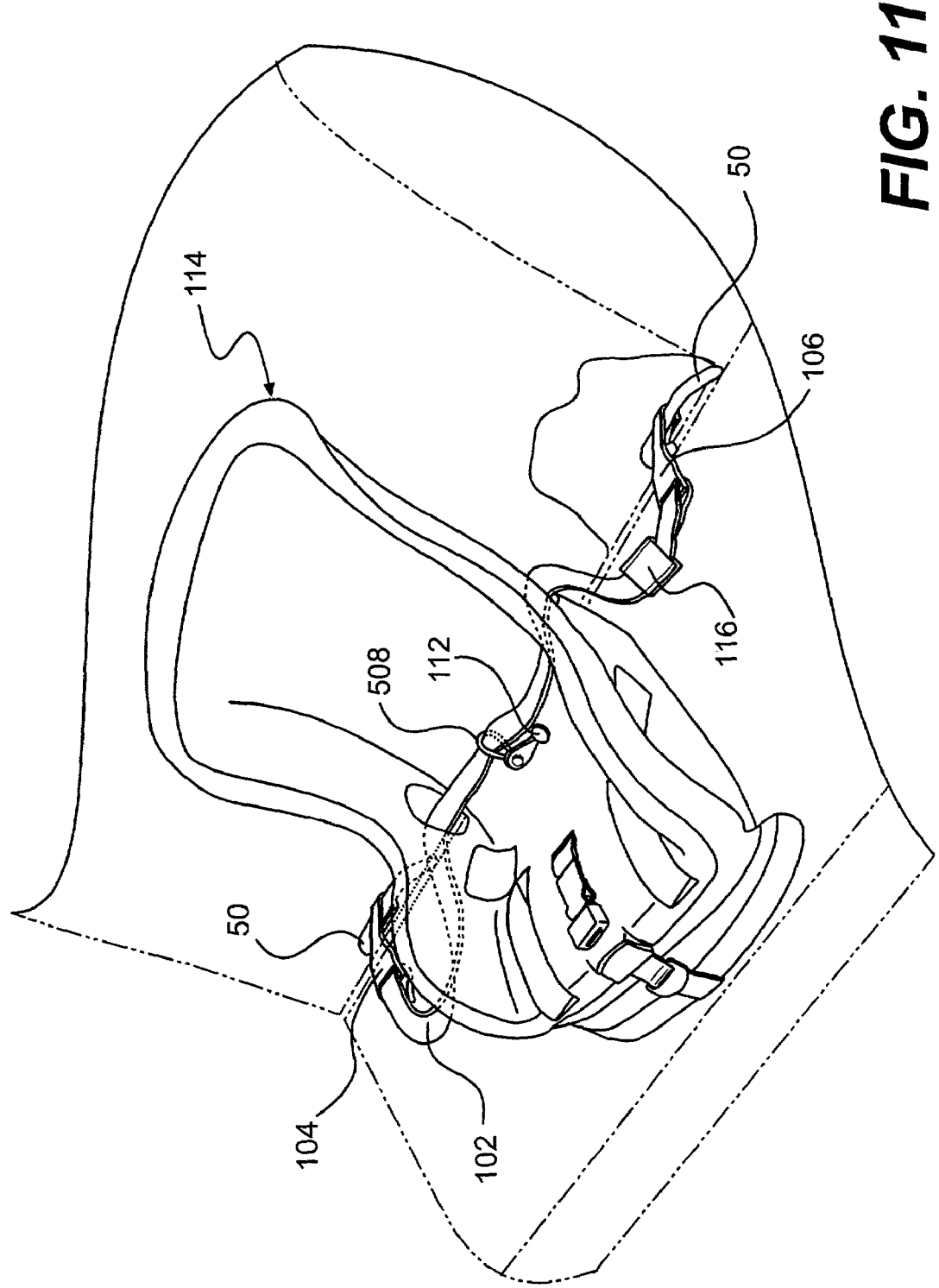
FIG. 11 is a perspective view showing an embodiment of the invention similar to that shown in FIG. 10, but which uses a molded plastic or plastic coated wire lanyard provided with a snap-together arrangement that permits the latch members to be separately sewn/connected to the ends of the securing belt prior to permanent connection to the lanyard.

FIG. 11 shows another embodiment of a connection member 508 suitable for use in the present invention. This connection member 508 comprises a lanyard, which can be either a molded plastic member or plastic coated wire, for example. In accordance with this embodiment, the lanyard connection member 508 can be manufactured in an open loop configuration. After being secured to the child seat 114, the connection member 508 then can be looped around the securing belt, and an end of the connection member 508 can be passed through a snap connection arrangement to permanently establish a loop through which the securing belt 102 can slide, but through which the latches 104, 106 at the ends of the securing belt 102 cannot pass. The provision of this type of snap connection enables the latches 104, 106 to be sewn/connected to the ends of the securing belt before being passed through the loop. The lanyard connection member 508 can be secured to the child seat using a press-in type fastener 112 of the type discussed above.

Figure 2:
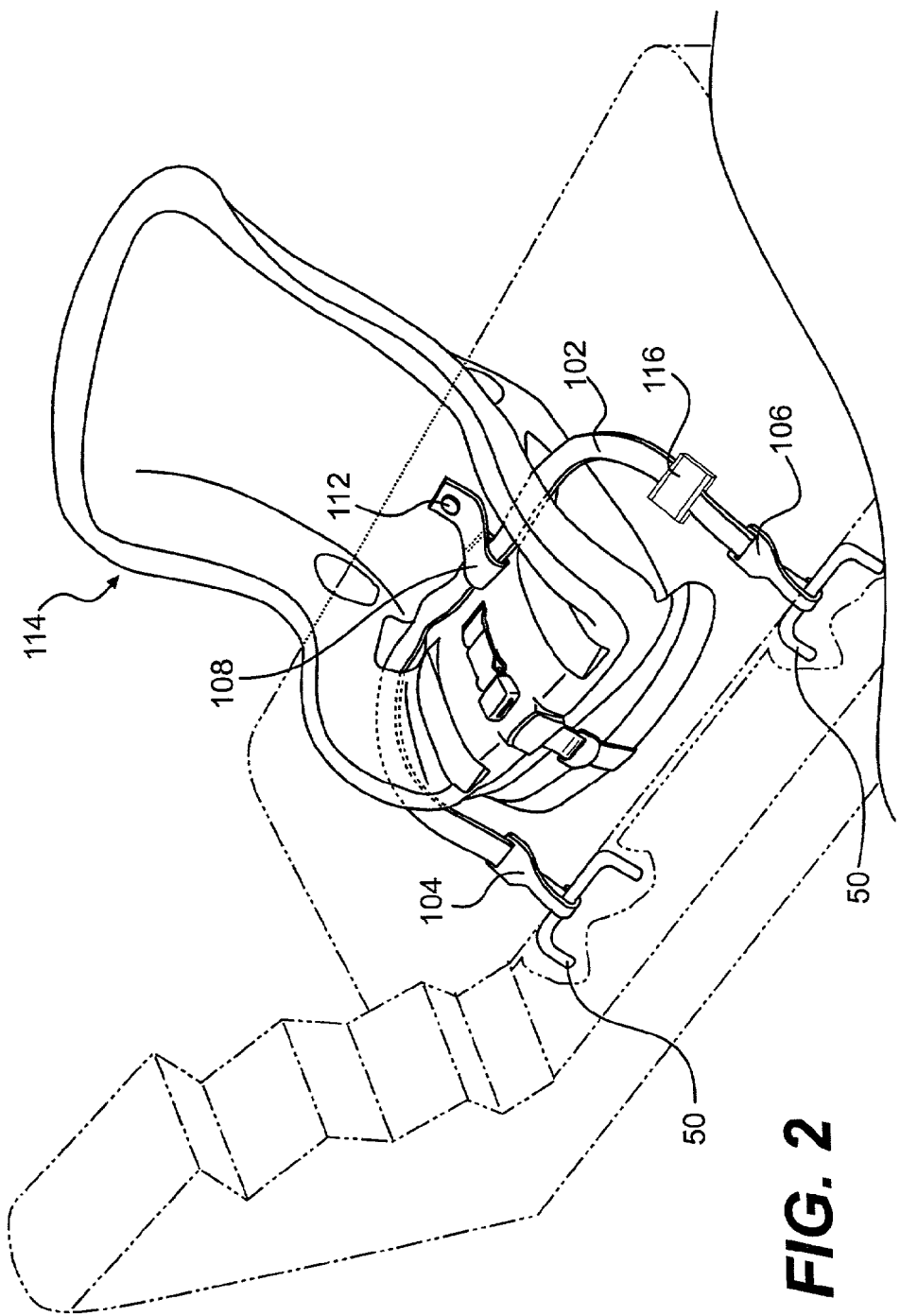
FIG. 2 is a perspective view showing a child seat secured in a rearward facing position on a vehicle seat using the latch system according to a first embodiment of the invention.
Figure 3:
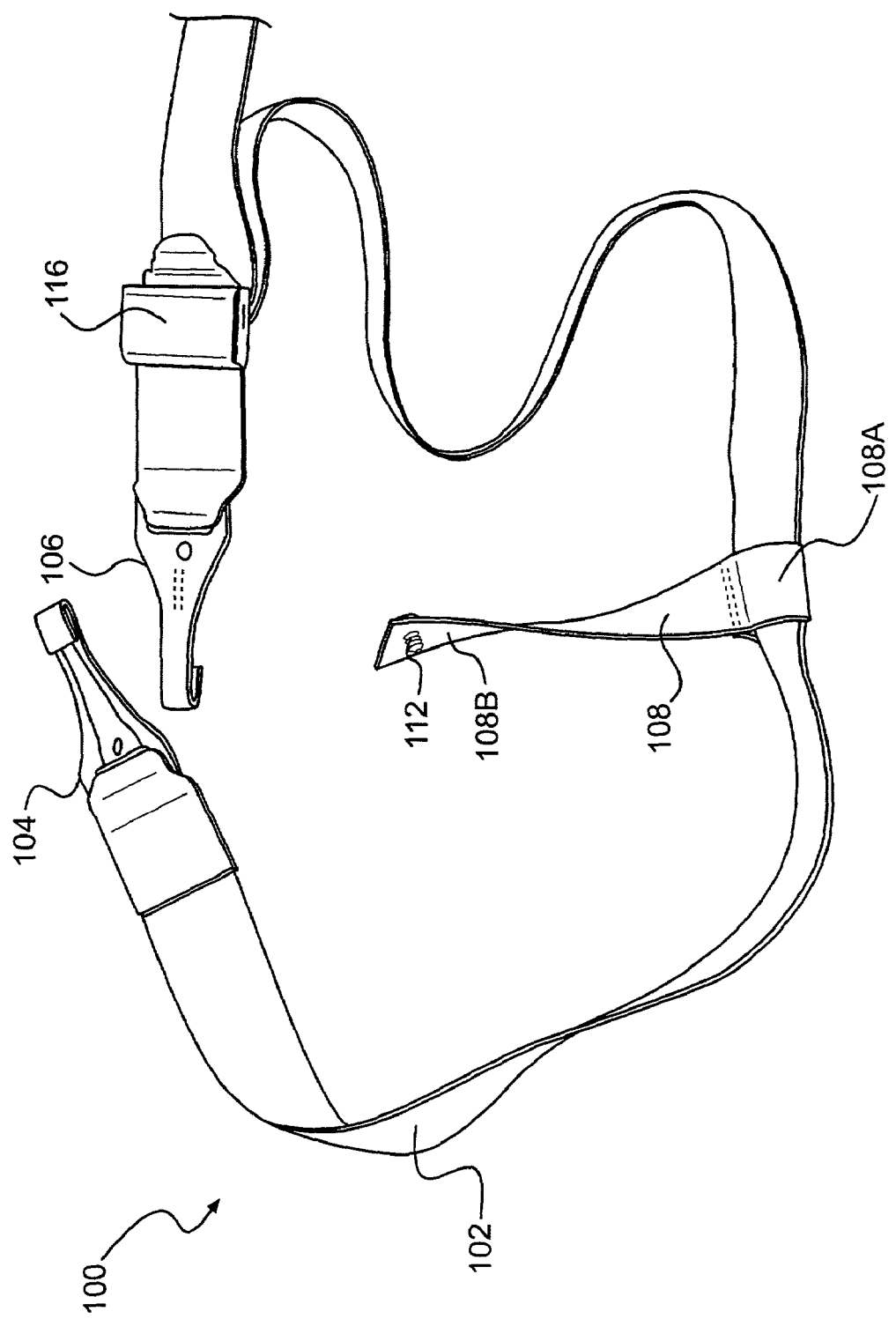
FIG. 3 is a perspective view showing components of the first embodiment of the latch system prior to connection to the child seat body.
Figure 12:
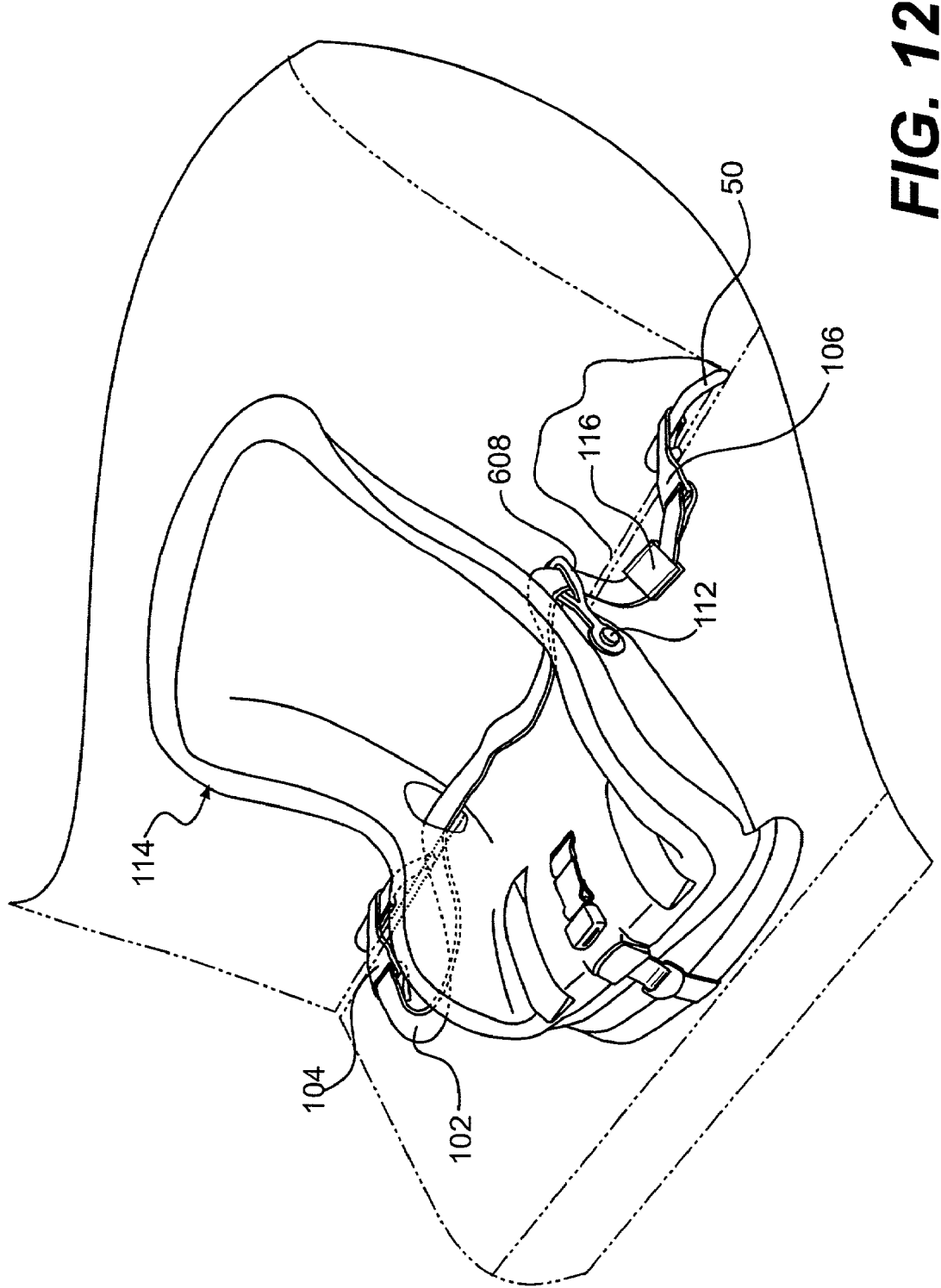
FIG. 12 is a perspective view showing an embodiment of the invention wherein a connection member is connected to an external surface of a side portion of the child vehicle seat.

FIG. 12 shows another embodiment of the invention, where a connection member 608 is connected to an external surface of the child seat 114. In this embodiment, the connection member 608 is secured to a side of the child seat 114. This connection member 608 is shown attached in a position suitable for use in the belt path of a forward facing seat. It will be appreciated, however, that, by pulling the securing belt 102 out of both openings through which it is shown disposed, and by rotating the connection member 608 approximately 180°, the securing belt 102 can be passed through the second pair of openings closer to the front of the child vehicle seat 114 to secure the child seat in a rearward facing position, such as shown in FIG. 2. Alternatively, the connection member 608 can made sufficiently flexible to fold in a manner similar to the connection member 108 of FIG. 1 and thus achieve the same result. In addition, although the connection member 608 is shown in FIG. 12 as a relatively rigid metal or plastic molded piece, it will be understood that a connection member made of webbing also could be used in this embodiment.

Figure 13:
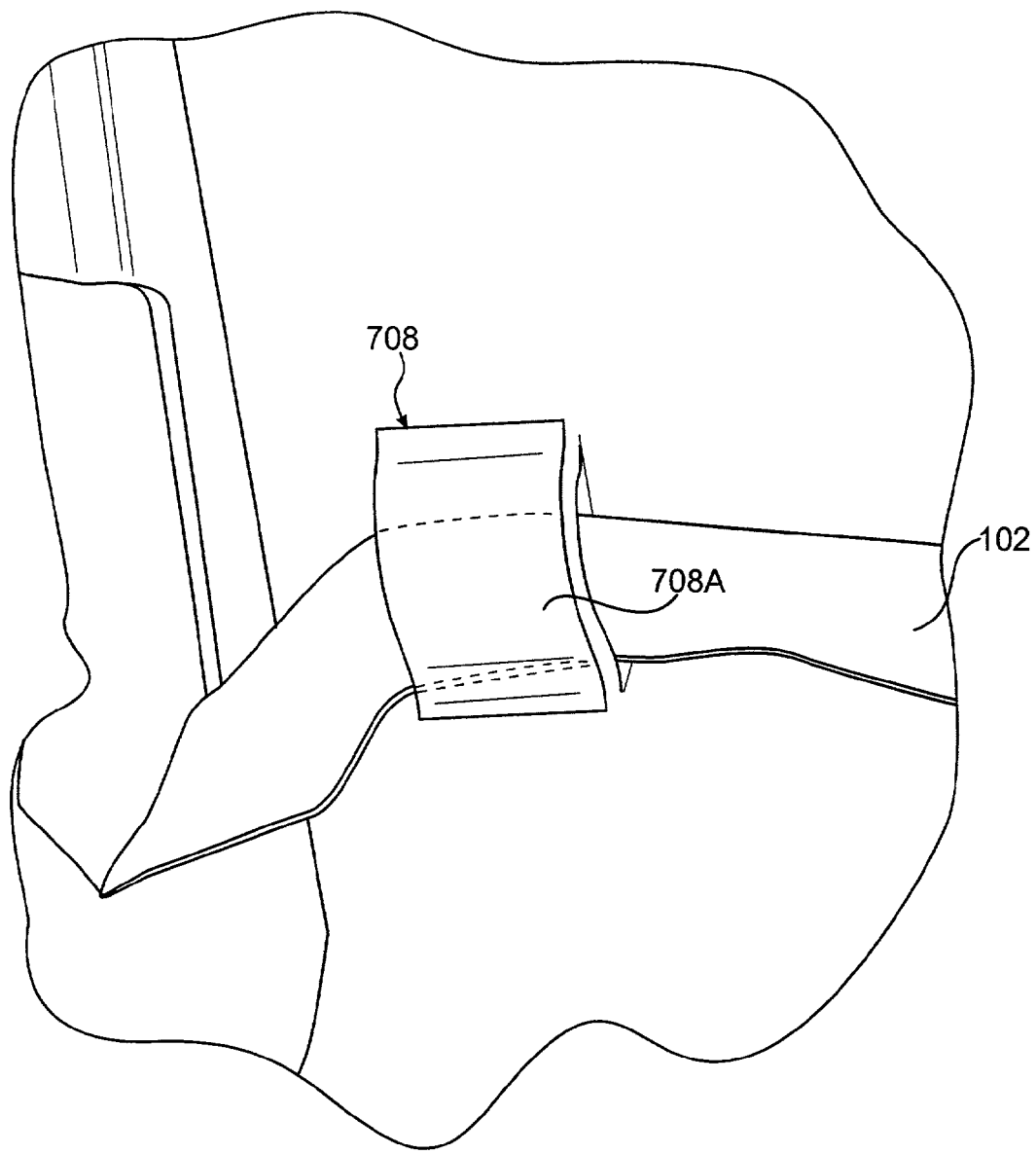
FIG. 13 is a perspective view showing an embodiment of the invention wherein a connection member is molded into the child seat body.

FIG. 13 shows a further embodiment of the invention. In this arrangement, the connection member is molded as a unitary part of the child vehicle seat. The connection member 708 forms a bridge-like configuration, where the ends of the bridge define loop 708A. The securing belt 102 can pass through the loop 708A. Once the securing belt 102 is passed through this loop 708A and the latches 104, 106 are sewn/connected to each end, a permanently connected latch system is established.

Figure 14:
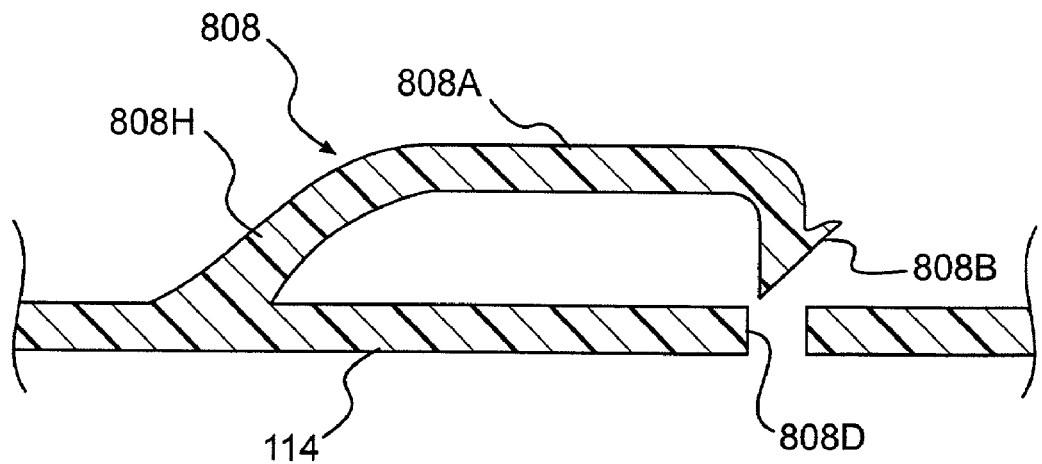
FIG. 14 is a sectional view showing a variant of the connection member shown in FIG. 13, wherein one end of a bridge-like portion acts as a flexible hinge, while the other end is provided with a snap connection arrangement which enables permanent connection between the child seat body and a barbed end of the connection member.

FIG. 14 shows a variant of the arrangement in FIG. 13. Instead of both ends of the bridge-like connection member being unitarily formed with the child vehicle seat 114, only one end of the connection member 808 is molded as part of the child seat. The molded end forms a flexible hinge portion 808H. The other end is formed with a barbed connection member 808B. The barbed connection member 808B, when pressed through the hole 808D, cannot be extracted, thus establishing a permanent connection with the child seat body. This figure is merely illustrative of one form of connection. Alternative barbed connections or other suitable connections can be used to achieve a permanent connection between the free end of the bridge-like connection member and the child vehicle seat.

The connection member 808 of FIG. 14 is configured so that a securing belt, already fitted with latches at its ends, can be slipped past the barbed connection member 808B into the loop defined by an arm 808A of the connection member 808 and the child seat 114. The securing belt then can be permanently connected to the child seat by snapping the barbed connection member 808B into the hole 808D. In this regard, the latches 104, 106 can be sewn or otherwise connected to the ends of the securing belt prior to slipping the securing belt into the loop. Although hinge portion 808H is formed as a spring hinge, this spring hinge can be replaced with a pivoting hinge of sufficient strength.

Figure 15:
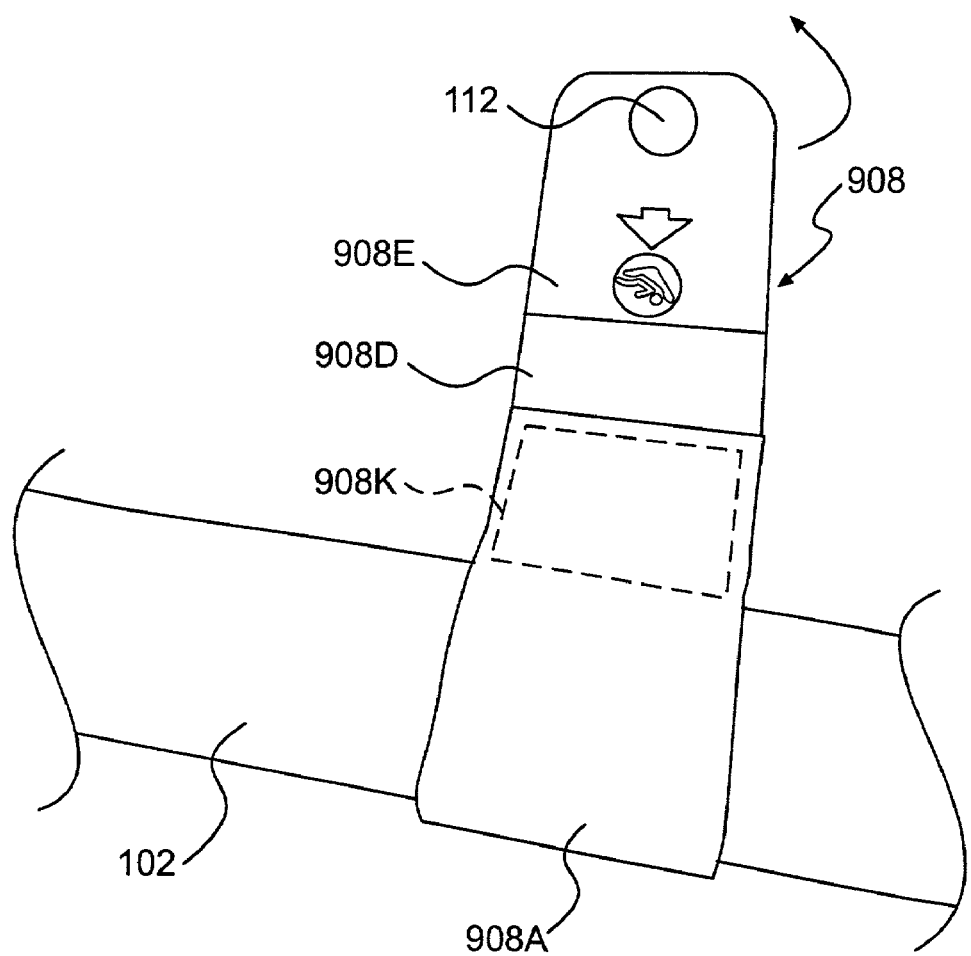
FIG. 15 is a plan view of an embodiment wherein the connection member is formed of a plastic member and webbing.
Figure 16:
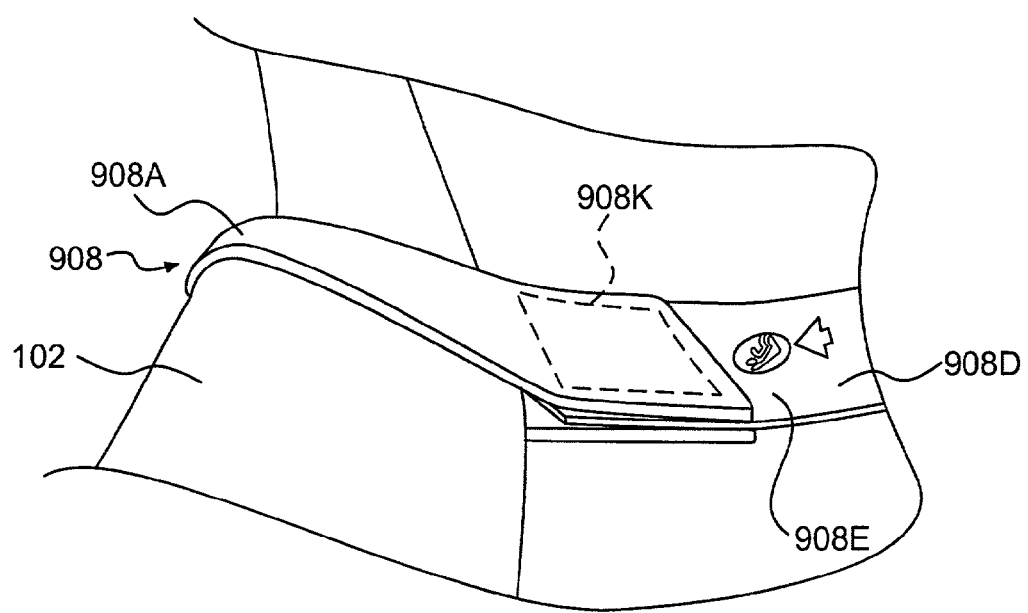
FIG. 16 is a perspective view showing a loop portion of the connection member shown in FIG. 15.

FIGS. 15 and 16 illustrate a further embodiment of the invention. Instead of being made entirely of webbing, the connection member 908 comprises a webbing loop 908A connected to a substantially flat elongate piece of non-webbing material 908D, such as plastic. The loop 908A can be connected to the piece of plastic 908D in a connection area 908K by stitching, hot staking, ultrasonic welding, or any other suitable connection technique. The piece of plastic, as shown, enables instructions 908E to be displayed thereon, along with indicators to indicate the correct orientations for use of the connection member 908 in a forward and rearward facing child vehicle seat.

Figure 17:
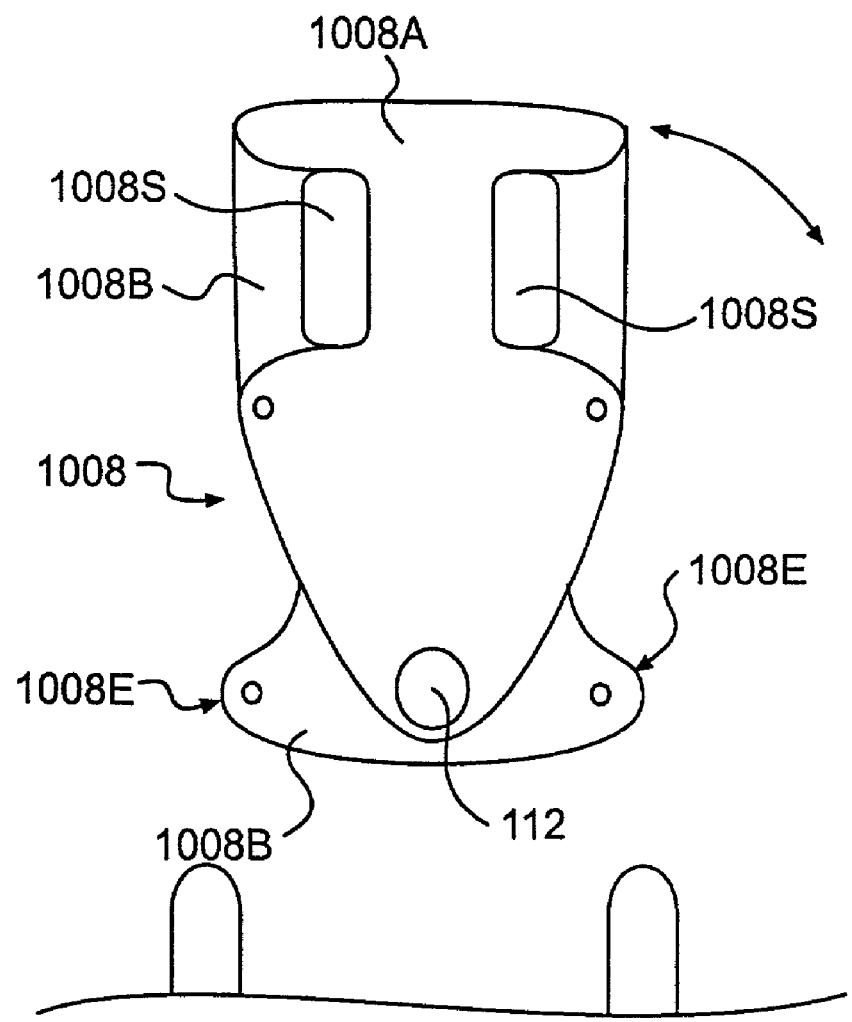
FIG. 17 is a plan view of yet another embodiment of a connection member which is formed of two overlaid flat members.
Figure 18:
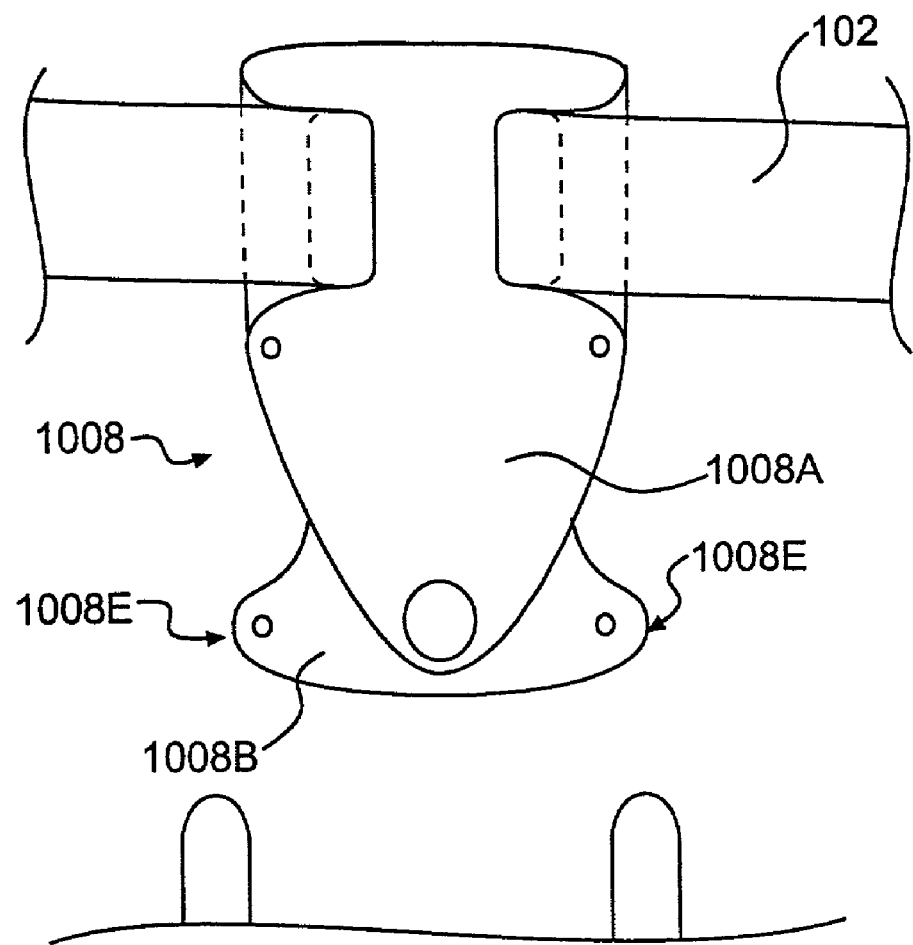
FIG. 18 is a plan view showing a securing belt disposed through a pair of openings formed in the connection member.

FIGS. 17 and 18 show another embodiment of a connection member in accordance with the invention. The connection member 1008 includes two substantially flat members 1008A, 1008B overlaid one on the other. The members 1008A, 1008B are securely and permanently connected to each other. The two members are shaped so as to provide a pair of slots 1008S through which the securing belt 102 of a latch system can be slidably disposed (see FIG. 17). At least one of the slots 1008S is sized to prevent the passage of latches therethrough. A hole is provided through both members 1008A, 1008B to receive a fastener 112 to permanently connect the connection member 1008 to the child vehicle seat. Each member 1008A, 1008B preferably is composed of a sheet of plastic.

The embodiment of FIGS. 17 and 18 is intended to pivot about the fastener 112 so as to enable the securing belt 102 to be disposed along either a forward or rearward facing belt path of a convertible child seat. In addition, the second member 1008B is provided with extensions 1008E. These extensions 1008E include openings through which fastening devices can be disposed in instances where it is desirable to prevent pivotal movement of the connection member 1008, such as in a booster seat, designed to face forward only, and in an infant seat, designed to face rearward only.

The embodiments disclosed above of the latch system ensure that the securing belt and latches remain permanently attached to the connection member. In this regard, the inside dimension of the loop portion of the connection member is sized smaller than the largest circumference of the latches disposed on the securing belt. Thus, although the securing belt can slide through the loop portion, the latches cannot. Because the connection member itself is permanently attached to the child vehicle seat, the securing belt and latches remain permanently attached to the seat as well.

While the latch system according to the present invention has been described with reference to only a limited number of embodiments, the various changes and modifications which can be made without departing from the scope of the invention, which is limited only by the appended claims, will be self-evident to a person of skill in the art of child vehicle seats, or art closely connected therewith.

The latches are not limited to the illustrated arrangements and alternative arrangements, such as off-the-shelf units and or other designs, may be used without departing from the spirit of the invention.

Further, although the connection members have been shown as being located in only a limited number of locations, it will be understood that they may be connected/disposed at any suitable location with respect to the belt path or paths with which they are associated. Selection of the location may depend on the amount of interference with the body of the seat occupant and the level of comfort that is required.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A child vehicle seat adapted for installation in a vehicle having anchor points disposed at predetermined portions of the vehicle, comprising:
   a seat body;
   a securing belt with latches at either end; and
   a connection member having a flexible loop portion through which the belt is slidably disposed and a connection portion that is permanently connected to a portion of the seat body,
   wherein the seat body has a plurality of openings formed therein which are adapted to:
      establish a first belt path along which the securing belt can pass to secure the child vehicle seat in a manner which allows the child vehicle seat to be secured in the vehicle so that it faces rearward with respect to a forward direction of travel of the vehicle; and
      establish a second belt path along which the securing belt can pass to secure the child vehicle seat in a manner which allows the child vehicle seat to be secured in the vehicle so that it faces forwardly with respect to the forward direction of travel of the vehicle.

2. A child vehicle seat as set forth in claim 1, wherein the loop portion has an inside dimension smaller than a circumference of a largest portion of the latches.

3. A child vehicle seat as set forth in claim 1, wherein the connection member comprises:
   a piece of webbing having a loop formed at a first end to define the loop portion and a connection hole at a second end to define the connection portion, the loop being sized to prevent the passage of a latch therethrough, and
   a fastener disposed through the connection hole and adapted to engage permanently in an opening formed in the seat body.

4. A child vehicle seat as set forth in claim 3, wherein the piece of webbing has a length sufficient for it to:
   a) extend away from the fastener to a site on the child vehicle seat wherein the securing belt is disposable along the first belt path, and
   b) fold over the fastener and extend to a site on the child vehicle seat wherein the securing belt is disposable along the second belt path.

5. A child vehicle seat as set forth in claim 3, wherein the piece of webbing has a length sufficient for it to:
   a) extend from the fastener to a site on the child vehicle seat wherein the securing belt is disposable along the first belt path, and
   b) rotate about the fastener and extend to a site on the child vehicle seat wherein the securing belt is disposable along the second belt path.

6. A child vehicle seat as set forth in claim 1, wherein the first securing belt path includes a first pair of openings formed in the seat body.

7. A child vehicle seat as set forth in claim 1, wherein the second securing belt path includes a first pair of openings formed in the seat body.

8. A child vehicle seat as set forth in claim 1, wherein the connection member comprises:
   a lanyard which has a loop at a first end; and
   a fastening member permanently connected at a second end, the fastening member being adapted for permanent connection to the seat body.

9. A child vehicle seat as set forth in claim 1, further comprising a length adjusting mechanism provided on the securing belt.

10. A child vehicle seat as set forth in claim 1, wherein the connection member comprises a loop of webbing attached to a piece of material, the piece of material having a hole adapted to receive a fastener.

11. A child vehicle seat as set forth in claim 1, wherein the connection member comprises a lanyard.

12. A child vehicle seat as set forth in claim 1, wherein the connection member comprises a molded plastic member.

13. A child vehicle seat as set forth in claim 1, wherein the connection member comprises a plastic coated wire.

14. A child vehicle seat adapted for installation in a vehicle having anchor points disposed at predetermined portions of the vehicle, comprising:
a seat body;
a securing belt with latches at either end; and
a connection member having a flexible loop portion through which the belt is slidably disposed and a connection portion that is permanently connected to a portion of the seat body,
wherein the connection member comprises:
a piece of webbing having a loop formed at a first end to define the loop portion and a connection hole at a second end to define the connection portion, the loop being sized to prevent the passage of a latch therethrough, and
a fastener disposed through the connection hole and adapted to engage permanently in an opening formed in the seat body, and
wherein the piece of webbing is:
manipulable to a first state wherein the securing belt is locatable along a first securing belt path adapted for connecting the child vehicle seat to the first and second anchor points with the child vehicle seat facing opposite a forward direction of vehicle travel; and
manipulable to a second state wherein the securing belt is locatable along a second securing belt path adapted for connecting the child vehicle seat to the first and second anchor points with the child vehicle seat facing in the forward direction of vehicle travel.

15. A child vehicle seat as set forth in claim 14, wherein, in the first state, the piece of webbing is folded over on itself and directed toward a first of a top and a front of the child vehicle seat.

16. A child vehicle seat as set forth in claim 14, wherein, in the second state, the piece of webbing is unfolded and is directed toward a second of a top and a front of the child vehicle seat.

17. A child vehicle seat as set forth in claim 14, wherein the first state is a state wherein the piece of webbing is rotated about the fastener so that it extends in a first direction toward a top of the child vehicle seat.

18. A child vehicle seat as set forth in claim 14, wherein the first state is a state wherein the piece of webbing is rotated about the fastener so that it extends in a second direction toward a front of the child vehicle seat.

19. A child vehicle seat comprising:
a seat body;
a securing belt with latches at either end; and
a connection member that is a unitary part of the seat body, the connection member forming a loop portion through which the securing belt can be slidably disposed,
wherein the seat body and the connection member comprise a single piece of material, and
wherein the seat body has belt path apertures through which the securing belt can pass, and the connection member is spaced from the belt path apertures.

20. A child vehicle seat as set forth in claim 19, wherein the connection member comprises a bridge shaped portion which defines the loop portion.

21. A child vehicle seat comprising:
a seat body;
a securing belt with latches at either end; and
a connection member including a first end unitarily formed with the seat body and a second end formed with a snap connection to permanently engage in an opening formed in the child vehicle seat,
wherein the seat body and the connection member comprise a single piece of material.

22. A child vehicle seat comprising:
a seat body;
a securing belt with latches at either end; and
a connection member including a connection portion that is permanently connected to a portion of the seat body and first and second substantially flat members connected to the connection portion, wherein the first member is overlaid on the second member and permanently connected thereto, the first and second flat members being configured to provide a pair of slots through which the securing belt can be slidably threaded, at least one of the slots being sized to prevent the passage of a latch member therethrough.

* * * * *